No. 790,612. PATENTED MAY 23, 1905.
N. F. BONIFACE.
WARMER FOR DISHES OR THE LIKE.
APPLICATION FILED NOV. 21, 1904.
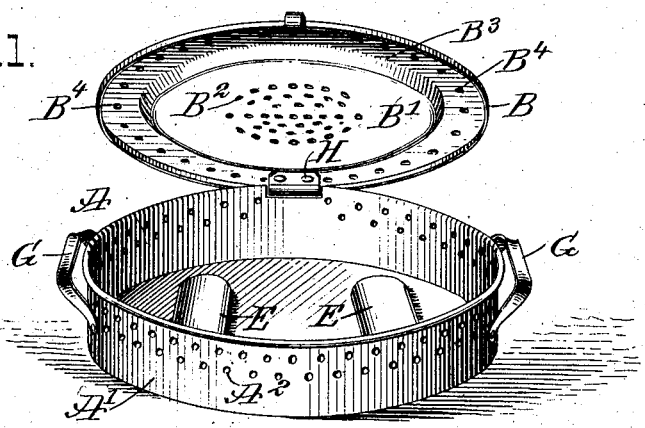
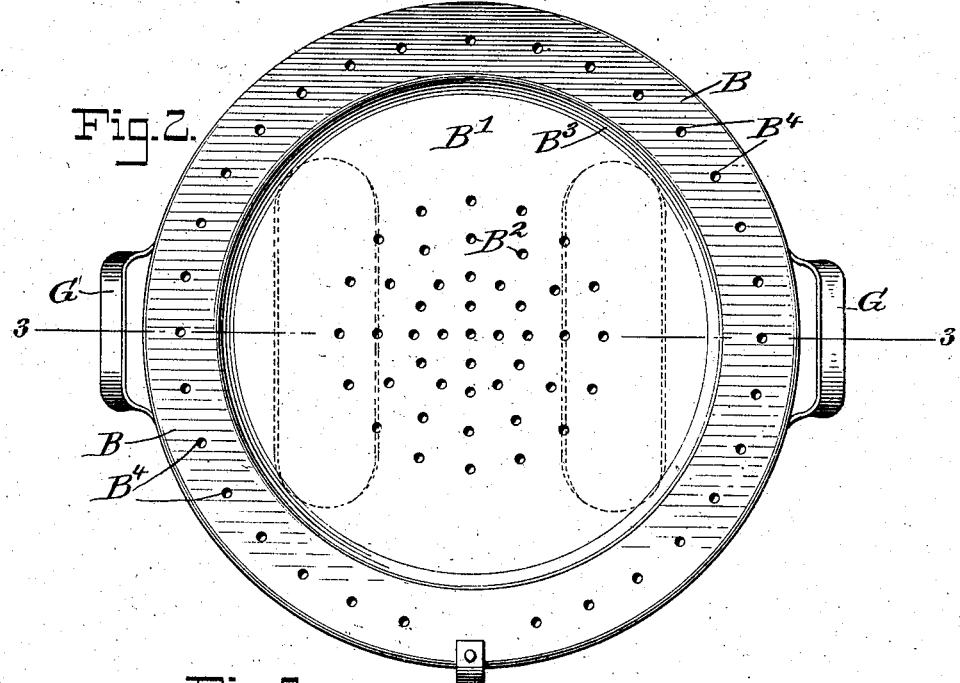
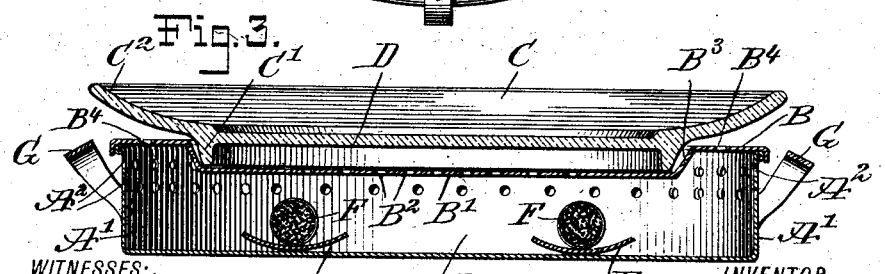
WITNESSES:
William P. Goebel.
Theo. G. Hoster.
INVENTOR
Nonna Ferner Boniface
BY
ATTORNEYS No. 790,612. Patented May 23, 1905.

UNITED STATES PATENT OFFICE.

NONNA FERNER BONIFACE, OF NEW YORK, N. Y.

WARMER FOR DISHES OR THE LIKE.

SPECIFICATION forming part of Letters Patent No. 790,612, dated May 23, 1905.

Application filed November 21, 1904. Serial No. 233,661.

*To all whom it may concern:*

Be it known that I, NONNA FERNER BONIFACE, a citizen of the United States, and a resident of the city of New York, borough of Manhattan, in the county and State of New York, have invented a new and Improved Warmer for Dishes or the Like, of which the following is a full, clear, and exact description.

The invention relates to kitchen and table articles; and its object is to provide a new and improved warmer for dishes and the like which is simple and durable in construction and arranged to contain and burn the fuel with a view to warm the dishes or like articles and keep the same warm for a long time without requiring recharging of the warmer with fuel.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement, showing the cover raised. Fig. 2 is a plan view of the improvement; and Fig. 3 is a sectional side elevation of the same on the line 3 3 of Fig. 2, showing a plate to be warmed in position.

The warmer or heater is preferably made of sheet metal and consists, essentially, of a comparatively shallow vessel forming a combustion-chamber A and adapted to support on its cover or top B the dish C to be warmed. The side wall A' of the combustion-chamber A is provided near its upper edge with perforations $A^2$, forming inlets for the air required to produce proper combustion, and the said top or cover B is provided with a central depressed portion B', having perforations $B^2$ for the passage of the heated air and gases into a heating-chamber D, formed between the upper surface of the cover B and the bottom of the dish C, having the usual bottom rim C' seated on the depressed portion B' adjacent to the angular side $B^3$ thereof to prevent lateral movement of the dish and to raise the bottom of the dish sufficiently high above the depressed portion to form the heating-chamber D. In the portion of the cover B between the depressed portion B' and the edge of the cover are formed draft-openings $B^4$ for the escape of the heated air and draft from the combustion-chamber, the said draft-openings being directly below the angular side rim $C^2$ of the dish C for the escaping heat and gases to heat the said rim from underneath.

On the bottom of the combustion-chamber A is arranged one or more holders or grates E for the fuel F, which latter is preferably what is called "Japanese fuel," in the form of sticks or cartridges which when ignited burn slowly provided the necessary amount of air is properly admitted to the combustion-chamber. The holders or grates E are preferably in the form of shallow troughs open at their ends, as plainly indicated in the drawings.

Access to the combustion-chamber A is preferably had by way of the cover B, adapted to be opened for placing the fuel in position and igniting the same. After the fuel is ignited the cover is replaced in position on the chamber, and then the dishes to be warmed are set on the cover, with the lowermost dish seated on the depressed portion B', as previously explained. An ordinary stick of fuel burns about an hour, and thus at a comparatively small expense the dish-warmer can be utilized to warm the dishes and to keep the same warm a desired length of time, it being understood that fresh fuel can be added from time to time if it is desired to keep the dish-warmer in use for a longer period.

Handles G are provided on the wall A' to allow of carrying the warmer about, it being understood that as the burning fuel does not generate any obnoxious fumes or gases the warmer can be set directly on a dining-table, if desired.

The cover B is preferably connected by a hinge H to the side A' of the combustion-chamber A; but this is not essential.

The bottom of the combustion-chamber A may, if desired, be lined with asbestos or similar non-heat-conducting material (not shown) to prevent the bottom from becoming too warm.

The warmer can be made of various shapes and sizes, according to the form and size of the dishes to be warmed, and it may also be used for other purposes—for instance, as a foot-warmer or for warming beds and the like.

Having thus described my invention, I claim as new and desire to secure by Letters Patent—

1. A warmer for dishes and the like, comprising a combustion-chamber having air-inlets, and a top for supporting the article to be warmed, the top having a central perforated depressed portion, and also having perforations between the depressed portion and the edge of the top.

2. A warmer for dishes and the like, comprising a combustion-chamber closed at the bottom and having perforations in its side wall, for the entrance of air, and a perforated top having a depressed perforated portion for supporting the article to be warmed, and concave holders on the bottom of said chamber for supporting sticks of fuel.

3. A warmer for dishes and the like, comprising a combustion-chamber, provided with a top having a depressed central perforated portion for supporting the article to be warmed, the said cover also having perforations between the depressed portion and its edge, and means for burning solid fuel in the said chamber.

4. A warmer for dishes and the like, comprising a combustion-chamber closed at the bottom and provided with perforations in its side wall for the entrance of air, a cover for the open top of the chamber having a depressed central perforated portion for supporting the article to be warmed, the said cover being also provided with perforations between the depressed portion and the edge of the cover, and means for burning fuel in the said combustion-chamber.

In testimony whereof I have signed my name to this specification in the presence of two subscribing witnesses.

NONNA FERNER BONIFACE.

Witnesses:
   THEO. G. HOSTER,
   JNO. M. RITTER.